(12) United States Patent
Carpenter, Jr.

(10) Patent No.: US 9,834,461 B2
(45) Date of Patent: Dec. 5, 2017

(54) SYSTEM AND METHOD OF TREATING WASTEWATER

(71) Applicant: William Neil Carpenter, Jr., Auburn, CA (US)

(72) Inventor: William Neil Carpenter, Jr., Auburn, CA (US)

(*) Notice: Subject to any disclaimer, the term of this patent is extended or adjusted under 35 U.S.C. 154(b) by 305 days.

(21) Appl. No.: 14/453,486

(22) Filed: Aug. 6, 2014

(65) Prior Publication Data
US 2016/0039695 A1 Feb. 11, 2016

(51) Int. Cl.
C02F 3/30 (2006.01)
C02F 3/12 (2006.01)

(52) U.S. Cl.
CPC .......... *C02F 3/1247* (2013.01); *C02F 3/302* (2013.01); *Y02W 10/15* (2015.05)

(58) Field of Classification Search
CPC ...... Y02W 10/15; C02F 3/1247; C02F 3/301; C02F 3/302; C02F 3/02; C02F 3/109; C02F 2301/026; B01D 21/0042
USPC ........................................ 210/926, 521, 615
See application file for complete search history.

(56) References Cited

U.S. PATENT DOCUMENTS

| 3,713,543 | A | * | 1/1973 | Heaney | .................. B01D 21/00 |
| | | | | | 210/196 |
| 3,809,242 | A | * | 5/1974 | Bosje | .................... C02F 3/1247 |
| | | | | | 210/195.3 |
| 3,917,532 | A | † | 11/1975 | King | |
| 4,882,046 | A | | 11/1989 | Waite | |
| 5,413,706 | A | | 5/1995 | Graves | |
| 5,534,147 | A | * | 7/1996 | Kallenbach | ............. C02F 3/006 |
| | | | | | 210/605 |
| 6,303,026 | B1 | † | 10/2001 | Lindbo | |
| 8,551,341 | B2 | | 10/2013 | Conner et al. | |
| 2006/0226071 | A1 | * | 10/2006 | Allen | ..................... B01D 36/04 |
| | | | | | 210/620 |

FOREIGN PATENT DOCUMENTS

EP 0 526 853 † 2/1995
JP 2003275786 A * 9/2003

OTHER PUBLICATIONS

Rajiv et al, English machine translation JP 2003-245486, Sep. 30, 2003, pp. 1-3.*

* cited by examiner
† cited by third party

*Primary Examiner* — Claire A Norris (57) ABSTRACT

A system and a method comprises a chamber configured to receive a flow of a wastewater mixture from an input. A first baffle wall forms a first channel within the chamber. The wastewater mixture flows from an input to an output of the first channel. A second baffle wall forms a second channel and a third channel within the chamber. The wastewater mixture flows from the output of the first channel to an input of the second channel to an output of the second channel to an input of the third channel to an output of the third channel. The output of the third channel is configured to direct the flow to an output from the first chamber.

7 Claims, 4 Drawing Sheets

SYSTEM AND METHOD OF TREATING WASTEWATER

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to hydrodynamics and water treatment. More particularly, the invention relates to a system and method of treating wastewater that includes concentric baffles.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It is believed that wastewater treatment and water reclamation are becoming increasingly important aspects of urban, suburban, and rural planning and residential, commercial, and institutional development. As population densities increase and housing developments spread in many areas, existing processing capacity provided by municipal treatment systems in these areas may become strained. In some cases, limits on municipal processing capacity may restrict or deter new residential, commercial, and institutional development projects or urban, suburban, and rural growth. Moreover, one can expect that providing and maintaining clean water resources may also become increasingly important given the demands that growing populations may place on existing fresh water supplies.

In an effort to reduce the strain on municipal wastewater processing facilities and simultaneously address water shortages, it may be advantageous to reclaim wastewater on-site at a residential, commercial, and institutional level. In some cases, wastewater produced by a residential, commercial, and institutional household can be reclaimed and processed for use in irrigation, flushing toilets, or other applications that may not require purified drinking water. One can expect that reclaiming even a modest percentage of wastewater for reuse may result in a significant impact on the availability of fresh water resources. It is believed that decentralized, on-site systems can be used to capture, process, and reuse wastewater without an expensive municipal sewage infrastructure or a centralized water treatment facility. Additionally, due to the ability to operate without existing infrastructure, decentralized, on-site systems may be incrementally added to areas to help provide increased wastewater treatment capacity, typically without requiring a significant capital investment.

By way of educational background, an aspect of the prior art generally useful to be aware of is that a currently available alternative to municipal wastewater treatment systems is to use a residential, commercial, and institutional septic tank system. Traditional septic tank systems generally have one or more large chambers or tanks for receiving an input flow of wastewater. In some traditional septic tank systems, the wastewater is delivered to a large chamber or cavity that allows the wastewater to circulate freely. In these systems, a surge in the input flow may cause turbulent currents in the chamber, which may create dead zones where wastewater does not flow properly and may impair processing of the wastewater. These internal currents may also disrupt settled solids, which may hinder the wastewater processing. Furthermore, it is believed that the wastewater treated in traditional systems may not spend a consistent amount of time in an input chamber depending on multiple variable factors, including the liquid level in the chamber, the flow rate of the wastewater input, and internal currents that may develop in the chamber. For example, a sudden surge of wastewater delivered into a chamber that is nearly full may cause a portion of the wastewater near the top of the chamber to be purged too soon. Additionally, portions of wastewater near the bottom of the chamber or located in dead zones may be unaffected by the input flow and remain in the chamber too long. Due to these effects, one can expect that normal variations or surges in the input flow may lead to inconsistent processing and/or inefficiencies in traditional septic tank systems. Furthermore, baffling schemes of current septic tanks typically have a very short hydraulic and indeterminate flow path, reducing settling detention time and often preventing extended periods of contact between the microbes and the nutrients in the tank chambers, which aid in the breakdown of waste material.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a diagrammatic top view of the wastewater treatment system, and FIG. 1B is a cross sectional side view of the wastewater treatment system;

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention, and variations thereof, provides a system and method of treating wastewater that comprises multiple concentric influent and/or effluent baffles for directing fluid flow within a chamber of a multi-chamber wastewater treatment system. In some embodiments, multiple concentric influent and/or effluent baffles have an arc of between 20 and 360 degrees. It is contemplated that some embodiments may reduce the impact that normal variations in input flow may have on the quality of the treatment process. As described by way of example with respect to FIG. 2, concentric influent and/or effluent baffle walls may be used in some embodiments to form one or more channels for directing the flow of a wastewater mixture through an initial chamber of a multi-chamber system. The channels may reduce turbulent currents caused by a surge in the input flow of the wastewater mixture and thereby may facilitate the settling process where suspended solids in the wastewater mixture sink to the bottom of the chamber. The channels may also force the wastewater mixture through the chamber in a fixed path to facilitate consistent and predictable treatment of the wastewater by controlling the amount of time the wastewater spends in the chamber.

Figure 1A:
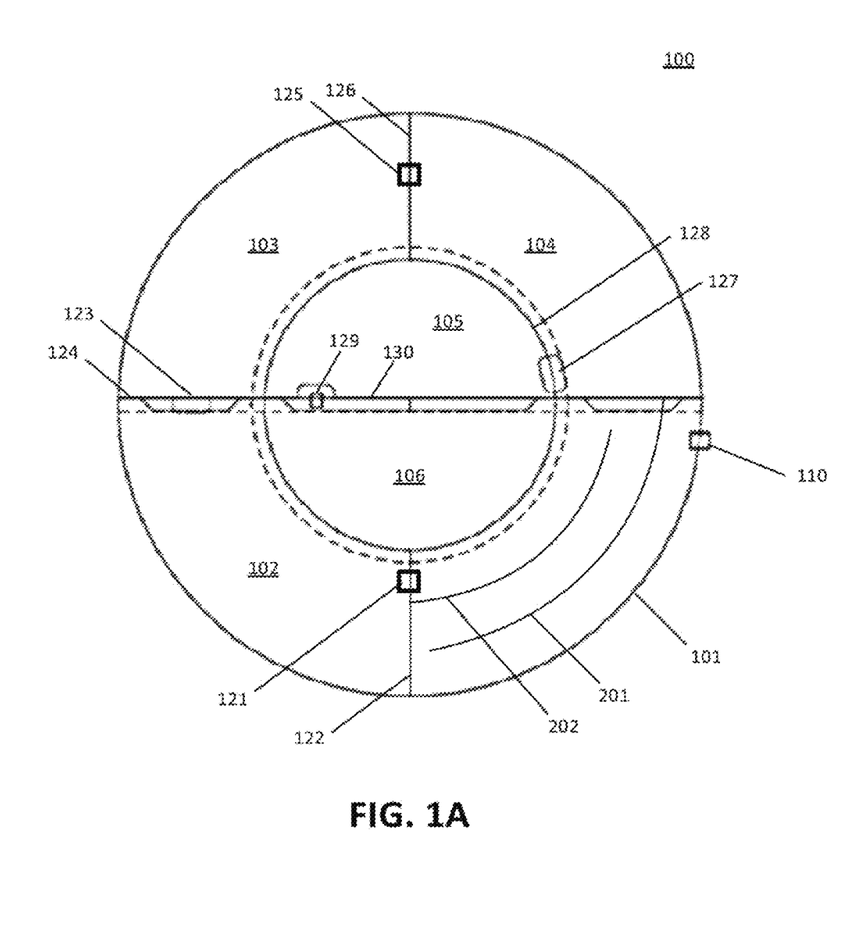
FIGS. 1A-1B illustrate an exemplary multiple-chamber wastewater processing system, in accordance with an embodiment of the present invention.
Figure 1B:
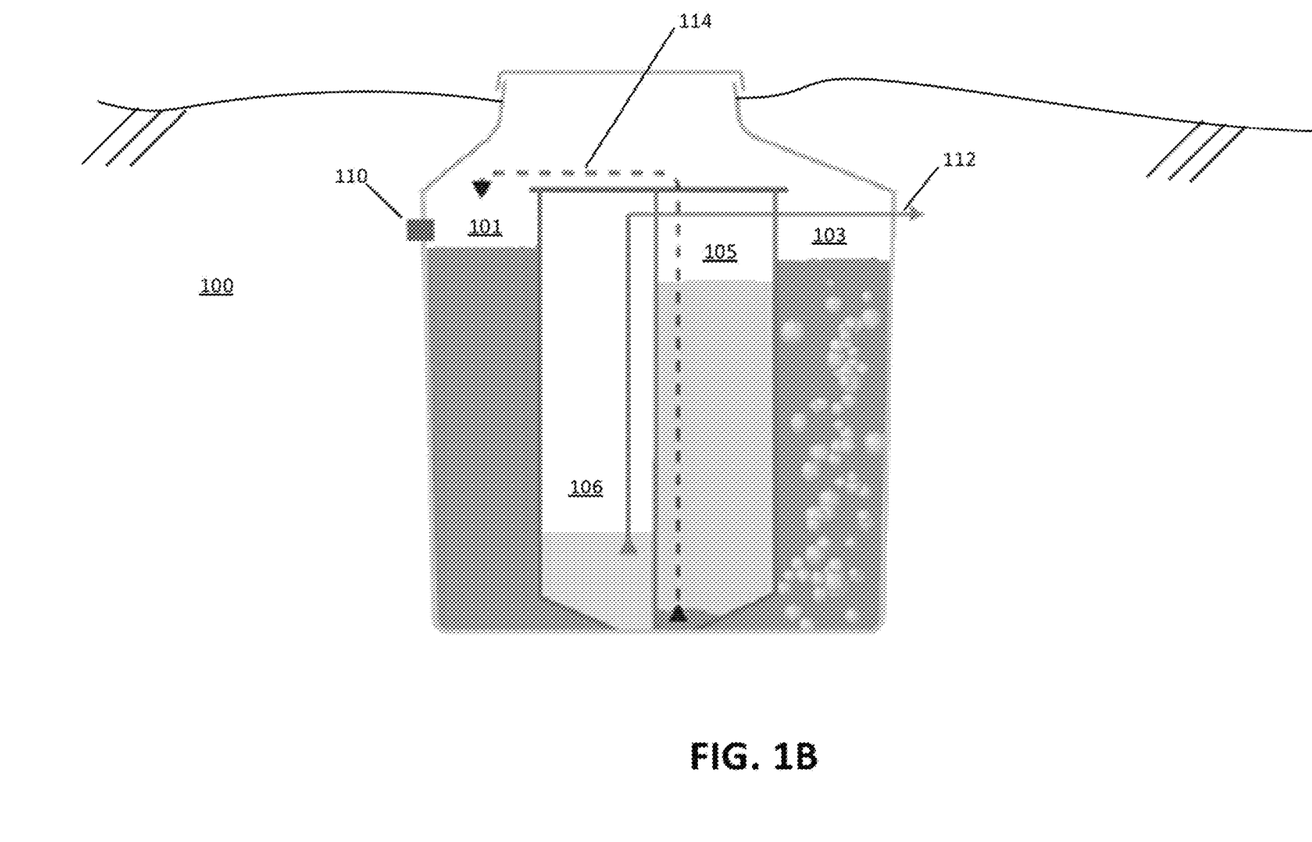

FIGS. 1A-1B illustrate an exemplary multiple-chamber wastewater processing system 100, in accordance with an embodiment of the present invention. FIG. 1A is a diagrammatic top view of wastewater treatment system 100, and FIG. 1B is a cross sectional side view of wastewater treatment system 100. In the present embodiment, system 100 may be used as a decentralized, on-site system to process residential, commercial, and institutional wastewater. Alternate embodiments may be used in commercial or public areas that do not have the infrastructure for a municipal water treatment system including, but not limited to, parks, malls, commercial farms, etc. In the present embodiment, system 100 typically receives raw sewage from a nearby sewage piping system and converts this sewage into a clean water by performing a series of wastewater processes. In some cases, the clean water produced by system 100 is suitable for human consumption. In other cases, the clean water produced is not suitable for drinking, yet may be safe for toilet flushing, irrigation or other environmental uses such as, but not limited to, aquifer replenishment, etc.

Referring to FIG. 1A, system 100 comprises a first chamber 101, a second chamber 102, a third chamber 103, a fourth chamber 104, a fifth chamber 105, and a sixth chamber 106. Alternate embodiments may be implemented with more or fewer chambers. In the present embodiment, system 100 is configured to receive a flow of wastewater via an input conduit 110. The flow of wastewater provided to input conduit 110 may be determined by, for example without limitation, the water usage of an occupied building and may differ at various times. The wastewater flowing into input conduit 110 typically comprises a combination of water and biodegradable solids herein referred to as a wastewater mixture.

An initial stage of processing in system 100 occurs in first chamber 101 in which sludge and solids in the wastewater mixture are broken up and sludge and heavy solids are permitted to settle while lighter solids and flocculated material are permitted to float. First chamber 101 may maintain suboxic conditions characterized by low oxygen and low sulfur content to help enable the wastewater mixture to begin the initial stages of decomposition. In some cases, the wastewater mixture may be at least partially decomposed through an ammonification process, which may include decomposing organic nitrogen proteins and peptides into ammonia and ammonium ions. In some cases, the decomposition of the wastewater mixture may begin upstream of input conduit 110 in, for example without limitation, in the pipes of a plumbing system or in a pre-treatment vessel.

In the present embodiment, first chamber 101 is configured to hold between 400 and 600 gallons of fluid. In other embodiments, the first chamber 101 may hold more or less fluid. For example, without limitation, some embodiments may be implemented to hold as little as 20 and as much as 10,000 gallons of fluid. In the present embodiment, first chamber 101 may also be configured to hold non-degradable solids that may accumulate over a period of time.

First chamber 101 comprises two concentric influent and/or effluent baffle walls 201 and 202. Baffle walls such as these are described by way of example in more detail with respect to FIG. 2. Concentric influent and/or effluent baffle walls 201 and 202 are configured to be offset from each other and may direct the flow of the wastewater mixture through first chamber 101 along a winding, fixed path to facilitate consistent and predictable treatment of the wastewater mixture in first chamber 101. In some embodiments, the channels formed by concentric influent and/or effluent baffle walls 201, 202 may also produce a somewhat laminar flow of the wastewater mixture within first chamber 101, which may facilitate settling of sludge and heavy solids and floatation of lighter solids and flocculated material. Furthermore, in the present embodiment, the winding configuration of the channel formed by concentric baffle walls 201 and 202 may lengthen the flow path of the wastewater mixture to typically allow for an increased amount of reasonable settling in first tank 101 and better comingling of the constituents of chamber 101 to aid in the ammonification process in a relatively small amount of space.

Due in part to concentric influent and/or effluent baffle walls 201 and 202, the suboxic process of first chamber 101 may be able to accommodate normal variations in the input flow of wastewater without suffering significant degradation in process performance. For example without limitation, processing in first chamber 101 may accommodate input flow rates from 10 to 25 gallons per minute without significant performance degradation. In some embodiments, first chamber 101 may be able to accommodate a flow rate greater than 25 gallons per minute without significant process depredation. In the present embodiment, first chamber 101 may be used to buffer the variable flow of the wastewater mixture delivered through input conduit 110 and may reduce the effects of the variable input flow on downstream chambers of system 100.

Referring to FIG. 1A, second chamber 102 is adjacent to first chamber 101 and is separated from the first chamber 101 by a wall 122. The partially processed wastewater mixture from first chamber 101 may flow into second chamber 102 through a large port 121 in wall 122. In the present embodiment, port 121 may be located at a point between the bottom and top of chambers 101 and 102. For example, without limitation, port 121 may be located approximately half way up wall 122, which may enable liquid to pass between chambers 101 and 102 while blocking sludge and solids that have settled to the bottom and floated to the top of first chamber 101. It is contemplated that in some embodiments the port may be located at different points between the first and second chambers. Some embodiments may also comprise a filter material such as, but no limited to, a mesh over the port to typically prevent solid waste from entering the second chamber. Moreover, some embodiments may be implemented with multiple ports between the chambers.

In the present embodiment, second chamber 102 subjects the wastewater mixture to suboxic conditions similar to that of first chamber 101. This may enable the wastewater mixture to further settle and separate suspended solids. Typically, heavier solids may tend to sink to the bottom of the chamber and lighter solids may tend to flocculate and float or remain in suspension.

The further processed wastewater mixture then flows from second chamber 102 to third chamber 103 through a port 123 located in a wall 124 that separates third chamber 103 from second chamber 102. In the present embodiment, the wastewater mixture in third chamber 103 is subjected to aerobic digestion using a colony of nitrifying microorganisms, for example, without limitation, microorganisms of the *Nitrosomonas* and *Nitrobacter* genera. To promote the growth of nitrifying microorganisms, third chamber 103 may be aerated to enhance the oxygen content of the mixture. This may be achieved by placing a membrane air diffuser connected to an air supply to chamber 103. A multiplicity of suitable means may be used as the air supply including, without limitation, a high-efficiency, low-pressure linear blower device. The air diffuser may be configured to encourage oxygen transfer into the wastewater mixture in third chamber 103 and to facilitate mixing of dissolved substrates and oxygen in the wastewater mixture.

Because the wastewater mixture in third chamber 103 typically tends to be low in carbon and high in ammonia, the enhanced oxygen content provided by the aeration promotes the growth of the nitrifying microorganisms. In a typical process, the nitrifying microorganisms convert the ammonia into nitrates utilizing the oxygen in the wastewater. In particular, the ammonia may be biologically removed in a two-step process. First ammonia is oxidized into nitrite, and then the nitrite is oxidized to nitrate. The nitrification process in third chamber 103 may be affected by multiple factors, including, without limitation, detention time or the amount of time a volume of liquid is processed, dissolved oxygen content, temperature, etc. In the present embodiment, processing in chamber 103 may be optimized for detention times greater than 8 hours, dissolved oxygen content greater than 4 mg/L, and temperatures between 22 and 34 degrees Celsius. Because these parameters depend, at least in part, on the rate that liquid that is introduced into third chamber 103, acceptable processing conditions can be maintained by preventing rapid changes in the introduction of wastewater into third chamber 103. In other embodiments, these parameters may be greater or less. The oxygen content may be optimized by the settings of the air diffuser. Detention time may be controlled by the length, spacing, shape, etc. of baffle walls 201 and 202 in first chamber 101. In alternate embodiments, additional baffle walls may be incorporated to affect the detention time. In the present embodiment, concentric influent and/or effluent baffle walls 201 and 202 in the first chamber 101 may help reduce the effect of a large surge of the wastewater mixture into downstream chambers, such as, but not limited to, third chamber 103. In particular, the concentric influent and/or effluent baffle walls 201, 202 may help to eliminate or reduce a surge of the wastewater mixture from propagating through system 100, which could disrupt processes that are sensitive to sudden changes in oxygen content, temperature, concentration, or other parameters affected by changes to the flow rate. In some embodiments, concentric baffling may allow for the preclarified wastewater mixture to transfer thermal energy and oxygen within the mixture, optimizing the mean process temperature and dissolved oxygen concentration, which stabilizes the biological process.

From third chamber 103, the partially processed wastewater mixture flows into fourth chamber 104 through a flow port 125 in a dividing wall 126. Referring to FIG. 1A, fourth chamber 104 is adjacent to third chamber 103 and is separated from third chamber 103 by dividing wall 126. Fourth chamber 104 performs additional aerobic processing similar to the process described above by way of example with respect to third chamber 103. Similar to third chamber 103, the process conducted in fourth chamber 104 may also be affected by multiple factors, including, but not limited to, detention time, dissolved oxygen content, and temperature, which are at least partially dependent on the flow rate of wastewater into fourth chamber 104. Thus, the surge protection provided by concentric influent and/or effluent baffle walls 201 and 202 may also be used to help maintain acceptable processing conditions in fourth chamber 104.

As a result of the processing performed on the first through fourth chambers 101, 102, 103, and 104, a substantially digested wastewater mixture is produced. In the present embodiment, third chamber 103 and fourth chamber 104 typically perform the majority of the aerobic processing on the wastewater mixture. In an alternative embodiment, a single chamber may be used to perform the majority of the aerobic processing. In another alternative embodiment, more than two chambers can be used to perform the majority of the aerobic processing to produce a substantially digested mixture.

Referring to FIG. 1A, the substantially digested wastewater mixture flows from fourth chamber 104 into an adjacent fifth chamber 105 through a port 127 located in a wall 128, which separates fourth chamber 104 from fifth chamber 105. In the present embodiment, clarification of the wastewater mixture is performed in fifth chamber 105. In a typical process, some or all of the remaining solids in the wastewater mixture usually settle to the bottom of fifth chamber 105 as sludge. As the solids are allowed to settle in fifth chamber 105, a volume of relatively clear liquid is produced. In many cases, it is desirable to maintain laminar flow conditions in fifth chamber 105. For example, without limitation, it is generally desirable to reduce turbulent currents and disruptive flows that may impede the settling of solids in fifth chamber 105. With the aid of other flow control elements such as, but not limited to, flow reduction ports, metering pumps, siphon pumps etc., concentric influent and/or effluent baffle walls 201 and 202 may also help to reduce the impact of a surge of the wastewater mixture in the settling of solids in fifth chamber 105.

Clarified wastewater in fifth chamber 105 may then flow into sixth chamber 106, which typically serves as a water storage tank. The clarified water is transferred between fifth chamber 105 and sixth chamber 106 through a port 129 in an output baffle wall 130. In addition, while being temporarily stored, further settling of some or all of any remaining solids in the clarified water may also occur in sixth chamber 106. Accordingly, it is generally desirable to maintain near-quiescent conditions in sixth chamber 106.

After the treatment process, the output of system 100 is typically clear water that is sufficiently clean for many domestic or industrial uses. In some cases, the resulting effluent produced by system 100 may be sufficiently processed for safe use in irrigation, such as, but not limited to, through sub-surface drip fields, above ground drip systems, spray systems, or the like. Referring to FIG. 1B, water can be removed from sixth chamber 106 through a water pipe 112 attached to a water pump (not shown). The clarified water in sixth chamber 106 may also be removed by gravity or syphon. The extracted clarified water can then be directed to a drip field irrigation system or other clean-water application. In addition, waste sludge may also be recirculated between chambers using a recirculation pipe 114. In the present embodiment, recirculation pipe 114 may be used to recirculate settled solids or sludge from the bottom of fifth chamber 105 into first chamber 101. Those skilled in the art will readily recognize, in light of and in accordance with the teachings of the present invention, that recirculation pipes in alternate embodiments may be arranged in a multiplicity of suitable configurations. For example, without limitation, one embodiment may comprise a separate recirculation pipe connecting the first chamber to each subsequent container. Other embodiments may only comprise recirculation pipes connecting the first chamber to the chambers where the final treatment processes occur.

In the present embodiment, system 100 may be configured to provide a maximum flow rate through each of the six chambers in order to optimize detention time necessary to typically allow for decomposition of bio-solids in the wastewater mixture. For example, without limitation, one metric of water safety may include biochemical oxygen demand (BOD). Typical wastewater treatment systems are typically required to produce an effluent with a BOD of 30 mg/L or less. Drinking water typically has a BOD of around 2 mg/L, while acceptable in-ground irrigation water usually has a BOD of around 15 mg/L. It is contemplated that system 100 may output an effluent with a BOD of less than 10 mg/L. However, some alternate embodiments may be configured to produce effluents meeting different standards depending on factors such as, but not limited to, the intended use of the effluent or local water safety guidelines.

Although a six-chamber system is described in the foregoing in regard to the embodiment illustrated by way of example in FIGS. 1A and 1B, it should be appreciated that many variations are also contemplated that may be integrated into some embodiments of the present invention. For examples without limitation, some embodiments may be implemented as systems with different numbers of chambers, different arrangements of successive chambers, different flow port shapes, different flow port sizes, etc.

Figure 2:
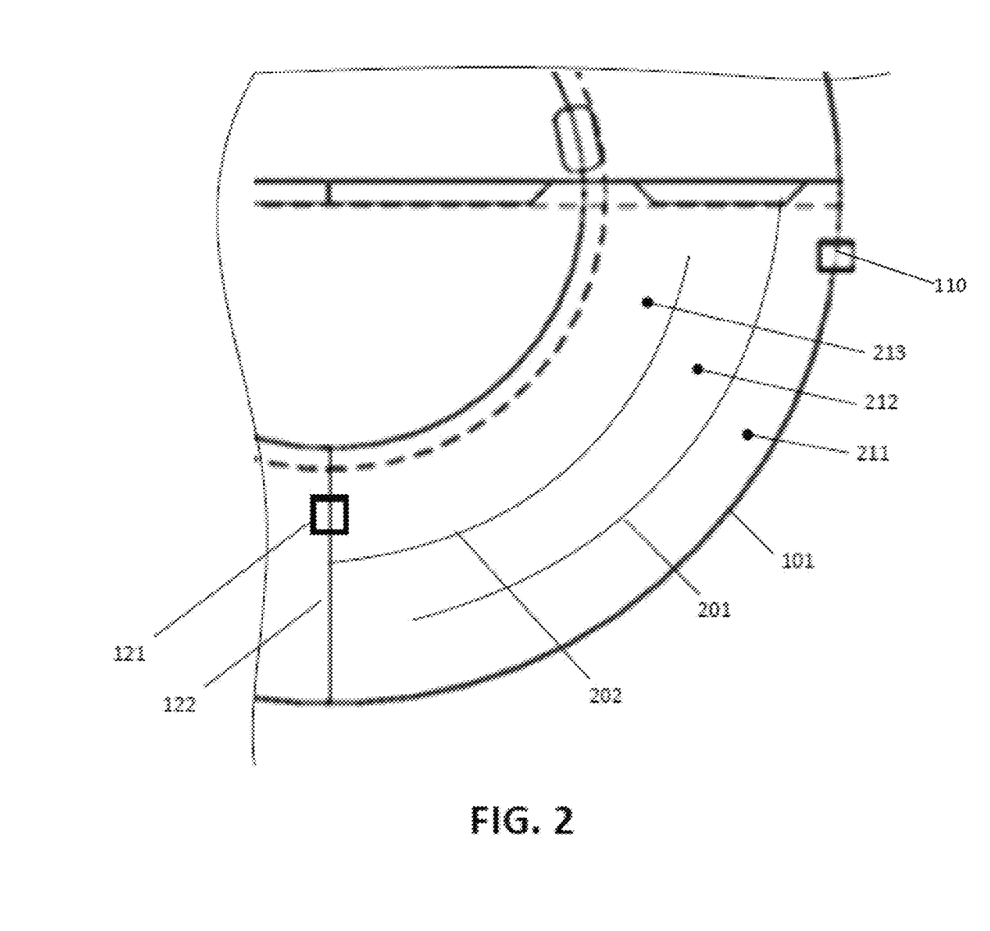
FIG. 2 is a diagrammatic top view of a first chamber of an exemplary wastewater treatment system comprising multiple concentric influent and/or effluent baffle walls, in accordance with an embodiment of the present invention.

FIG. 2 is a diagrammatic top view of a first chamber 101 of an exemplary wastewater treatment system comprising multiple concentric influent and/or effluent baffle walls 201 and 202, in accordance with an embodiment of the present invention. In the present embodiment, chamber 101 may house an initial stage of a multi-chamber wastewater treatment system, as described above, by way of example, with respect to FIGS. 1A-B. Referring to FIG. 2, chamber 101 comprises an input conduit 110 for delivering a flow of a wastewater into the system. Typically, input conduit 110 is connected to the output of a sewage system used to route wastewater produced by a household. The flow rate of the wastewater provided to input conduit 110 may be determined, at least in part, by the water usage of the building. Because water usage in the building typically varies over time, the flow rate of the wastewater into the system tends to also vary. In some cases, a surge or sudden increase in the input flow rate may occur, for example, without limitation, due to a sudden draining of a building appliance or reservoir such as, but not limited to, the draining of a washing machine after a wash cycle or the draining of a bathtub. The flow rate of the surge may also be affected by the size (diameter) of the conduit in the sewage system piping or by a flow restricting element upstream of the wastewater treatment system. In the present embodiment, concentric influent and/or effluent baffle walls 201 and 202 may help to isolate the effect of large variations in the input flow rate to portions of first chamber 101 of a wastewater treatment system. Concentric influent and/or effluent baffle walls 201 and 202 may also help to facilitate consistent and predictable treatment within chamber 101 by typically providing a fixed path for the wastewater mixture as it flows through chamber 101.

In the present embodiment, first chamber 101 also comprises a port 121 in a wall 122 for passing the wastewater mixture to an adjacent, downstream chamber for further processing. To help ensure consistent wastewater processing, it is typically beneficial for the wastewater mixture to be subjected to a consistent initial treatment in first chamber 101. One way to help facilitate consistent treatment is to induce the wastewater mixture to spend the maximum amount of time in first chamber 101 before being passed to downstream chambers for further processing. The amount of treatment time experienced by the wastewater mixture in a particular chamber may also be referred to as a detention time.

In the present embodiment, influent and/or effluent baffle walls 201 and 202 may be used to direct the wastewater mixture along a circuitous, fixed flow path through first chamber 101, thereby typically forcing the wastewater mixture to spend a predictable amount of time in first chamber 101. Referring to FIG. 2, first influent and/or effluent baffle wall 201 may be formed from a curved sheet of material and may form a first channel 211 between an outer surface of first influent and/or effluent baffle wall 201 and an inner surface of first chamber 101. Second influent and/or effluent baffle wall 202 may also be formed from a curved sheet of material and may form a second channel 212 between an inner surface of first influent and/or effluent baffle wall 201 and an outer surface of second influent and/or effluent baffle wall 202. A third channel 213 may be formed between an inner surface of second influent and/or effluent baffle wall 202 and another inner surface of first chamber 101. In alternate embodiments, additional baffles may be similarly placed in chamber 101.

Referring to FIG. 2, the wastewater mixture is directed through first channel 211 after entering first chamber 101 near a first end of first influent and/or effluent baffle wall 201 near an input conduit 110. The wastewater mixture typically flows through first channel 211 toward a second end of first influent and/or effluent baffle wall 201 opposite to the first end. The wastewater mixture is then directed around first influent and/or effluent baffle wall 201 through a gap between the second end of first influent and/or effluent baffle wall 201 and an interior surface of separation wall 122 and into second channel 212, which begins at a first end of second influent and/or effluent baffle wall 202. The wastewater mixture flows from the first end of second influent and/or effluent baffle wall 202 to a second end of second influent and/or effluent baffle wall 202, opposite to the first end. A gap between the second end of second influent and/or effluent baffle wall 202 may provide a path for the wastewater mixture to flow around second influent and/or effluent baffle wall 202 and into third channel 213. Third channel 213 may then direct the wastewater mixture from the second end of second influent and/or effluent baffle wall 202 to output port 121, where the wastewater mixture may exit first chamber 101. As a result, the wastewater mixture is typically forced to navigate the entire internal volume of first chamber 101, which may lead to a more consistent treatment time for the initial processing. In the present embodiment, chamber 101 comprises two baffle walls 201 and 202 to create three channels 211, 212 and 213. However, it is contemplated that in some embodiments, more than two baffle walls can be used to create additional channels within a chamber of the system. In yet other embodiments, only one baffle may be used to form two channels within the chamber.

In the present embodiment, influent and/or effluent baffle walls 201 and 202 may be attached to the surface of first chamber 101. The bottoms of influent and/or effluent baffle walls 201 and 202 may or may not form a water-impermeable seal between a lower edge of influent and/or effluent baffle walls 201 and 202 and the bottom of first chamber 101. In some embodiments, a gap may exist between the bottom edge of the influent and/or effluent baffle walls and the bottom of the first chamber. For example, without limitation, it is contemplated that a gap of less than a few inches near the bottom edge of the influent and/or effluent baffle walls may not significantly impact the ability of the influent and/or effluent baffle walls to direct the flow of the wastewater mixture through the first chamber. In some embodiments, the influent and/or effluent baffle walls may also be attached to each other and/or to other surfaces of the chamber for support and to help provide structural rigidity in the system.

In the present embodiment, influent and/or effluent baffle walls 201 and 202 may be formed from a sheet of composite material, such as, but not limited to, fiberglass sheet or reinforced resin. In some embodiments, sheet metal, sheet plastic, or other sheet materials may be used to form the influent and/or effluent baffle walls. Alternately, the baffle walls may be made of a non-sheet material. For example, without limitation, the baffle walls may be made of a molded plastic. In some embodiments, influent and/or effluent baffle walls 201 and 202 may also comprise stiffener ribs or other elements that may increase the structural rigidity of the baffle walls. In some embodiments, influent and/or effluent baffle walls 201 and 202 may also be configured for removal from first chamber, which may be helpful for periodic service or cleaning of the system.

In the present embodiment, the radius of first influent and/or effluent baffle wall 201 may be greater than the radius of second influent and/or effluent baffle wall 202. For example, without limitation, the radius of first influent and/or effluent baffle wall 210 may be between 4 and 6 inches greater than the radius of second influent and/or effluent baffle wall 202. Specifically, the radius of first influent and/or effluent baffle wall 201 may be approximately 5 inches greater than the radius of second influent and/or effluent baffle wall 202. In some embodiments, depending on factors such as, but not limited to, the size of the chamber and/or the size of the wastewater treatment system as a whole, the radius of the first influent and/or effluent baffle wall may be at least 2 inches greater than the radius of the second influent and/or effluent baffle wall or more than 6 inches greater than the radius of the second influent and/or effluent baffle wall. Typically, the radius of the first influent and/or effluent baffle wall is no less than 1 inch greater than the radius of the second influent and/or effluent baffle wall; however, in some embodiments configured for small scale applications, the baffle walls may be less than 1 inch apart. In some embodiments it may be beneficial to set a minimum and/or maximum ratio between width of a channel and the length of a channel. For example, without limitation, in one embodiment it may be optimal to provide a channel with a length that is at least 5 times the width of the channel and no longer than 20 times the width of the channel. Alternate embodiments may be implemented with various different ratios between the lengths and the widths of the channels.

In the present embodiment, influent and/or effluent baffle walls 201 and 202 may have an approximately constant radius curvature. In other embodiments, the influent and/or effluent baffle walls may have a variable radius curvature to conform to the shape of the walls of the chamber. In other embodiments, the influent and/or effluent baffle walls may be substantially flat. For example, without limitation, flat or non-curved walls may be used if the chamber is rectangular in shape. Those skilled in the art will readily recognize, in light of and in accordance with the teachings of the present invention, that baffle walls in some alternate embodiments may be configured in a multiplicity of suitable shapes, such as, but not limited to, multiple square or triangular waves, curved waves, right angles, elliptical arcs, etc.

In the present embodiment, first chamber 101 may be formed from a bottom, an outer curved wall, an inner curved wall, and two side walls connecting the outer curved wall and the inner curved wall. Influent and/or effluent baffle walls 201 and 202 may be installed in first chamber 101 so that influent and/or effluent baffle walls 201 and 202 are substantially concentric with each other and with the inner and outer walls of first chamber 101. In other words, the focal points of the arcs of influent and/or effluent baffle walls 201 and 202 are approximately aligned with the center point of the vessel comprising the wastewater treatment system, which is typically cylindrical in shape. It is contemplated that some alternate embodiments may be implemented in vessels of various different sizes and shapes such as, but not limited to, spherical tanks, oblong tanks, elliptical tanks, rectangular tanks, etc. Because influent and/or effluent baffle walls 201 and, 202 may be concentric in the present embodiment, channels 211, 212, and 213 typically have a substantially constant width, as measured between the surfaces of baffle walls 201 and 202 and the inside surface of chamber 101. Accordingly, channels 211, 212, and 213 may provide a uniform path for the wastewater mixture flowing through first chamber 101, which may offer several potential benefits to the wastewater treatment system.

For example, without limitation, channels 211, 212, and 213 may help to slow the flow of wastewater as it enters the wastewater treatment system. In some cases, channels 211, 212, and 213 may help to dissipate waves and currents created by a sudden surge in the input flow into first chamber 101. Typically, large waves or disturbances caused by an input surge may tend to bounce back and forth in first channel 211, thus dissipating a substantial amount of energy in first channel 211. To the extent that portions of waves or disturbances exit first channel 211, the waves or disturbances may be further isolated and dissipated in second channel 212. Third channel 213 may provide further dissipation, typically leading to the elimination or reduction of the impact of a sudden surge on downstream portions of the wastewater treatment system.

In addition, channels 211, 212, and 213 may also promote settling of the wastewater mixture by reducing internal currents within first chamber 101 by breaking up the interior volume of first chamber 101 and typically preventing internal currents from developing. Thus, to the extent that internal currents may be created by an input flow of wastewater, these internal currents are usually confined to portions of first channel 211. The reduction or prevention of internal currents in the wastewater mixture may help to enable sludge and heavy solids to settle to the bottom of chamber 101 and lighter solids and flocculated material to float.

In some instances, channels 211, 212, and 213 may also facilitate the development of a somewhat laminar flow within chamber 101. Fluidic friction caused by the surfaces of influent and/or effluent baffle walls 201 and 202 may slow the flow of the wastewater mixture as it passes through channels 211, 212, and 213. Typically, a boundary layer of laminar flow may form near the surfaces of influent and/or effluent baffle walls 201 and 202 and may develop into a laminar flow as the wastewater mixture is forced through channels 211, 212, and 213. Laminar flow conditions may also help to facilitate the settling process and may promote a more consistent treatment process.

Figure 3:
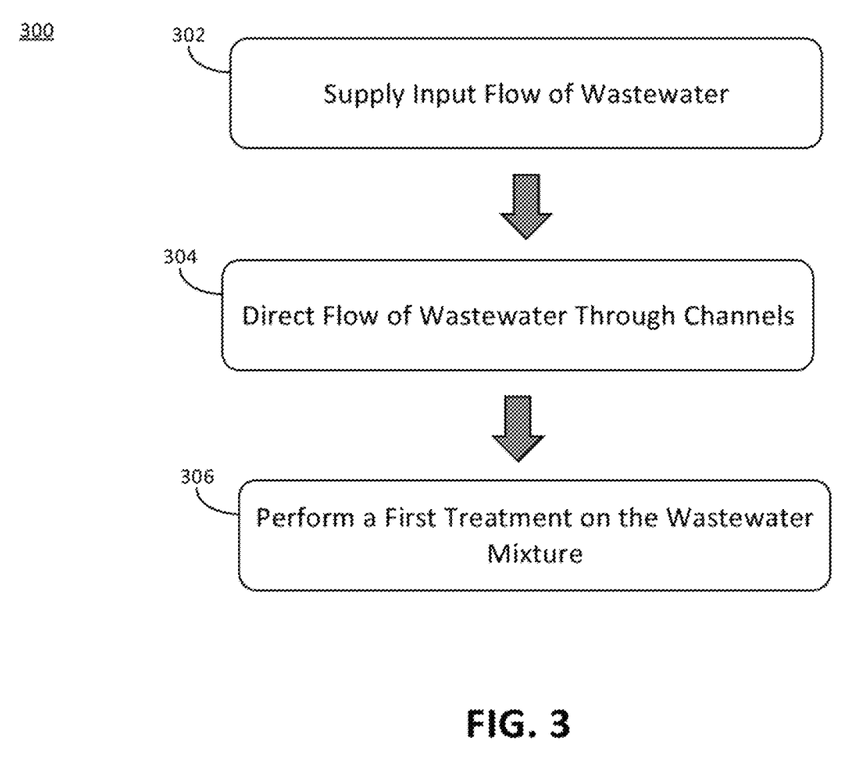
FIG. 3 is a flowchart illustrating an exemplary process for treating wastewater using a multi-chamber wastewater treatment system, in accordance with an embodiment of the present invention.

FIG. 3 is a flowchart illustrating an exemplary process 300 for treating wastewater using a multi-chamber wastewater treatment system, in accordance with an embodiment of the present invention. In the present embodiment, process 300 typically relates to an initial treatment process carried out in an initial chamber of the multi-chamber system. The wastewater treated using exemplary process 300 is typically subjected to further processing in downstream chambers of the multi-chamber system before exiting the system for use or storage.

In the present embodiment, process 300 begins with operation 302 in which an input flow of wastewater is supplied to a first chamber of the multi-chamber treatment system. With reference to FIG. 2, the input flow of wastewater may be provided to input conduit 110, which typically receives the flow from a sewage piping system. The input flow of wastewater may be created, for example without limitation, by flushing a toilet, by draining an appliance or vessel, or as a byproduct of other water use in a building. It is contemplated that the input flow rate may fluctuate throughout wastewater treatment process 300 depending on factors such as, but not limited to, what is providing the input flow. For instance, without limitation, in some cases a standard input flow rate of wastewater may be less than 10 gallons per minute and may go up to 15 gallons per minute. In some cases the input flow rate of wastewater may surge up to 25 gallons per minute or even more if a task requiring a large amount of water is carried out, such as, but not limited to, emptying a bathtub, draining a hot water heater, changing washing machine cycles, etc.

In the present embodiment, process 300 then proceeds to operation 304 in which a flow of the wastewater mixture is directed through channels formed by concentric baffle walls in the first chamber. The wastewater mixture first flows through a first channel formed between an outer surface of a first influent and/or effluent baffle wall and an inner surface of the first chamber. The flow of wastewater mixture may then be directed through a second channel formed between an inner surface of the first influent and/or effluent baffle wall and an outer surface of a second influent and/or effluent baffle wall. The flow may then be directed through a third chamber formed between an inner surface of the second influent and/or effluent baffle wall and an inner surface of the first chamber. A structural configuration for performing this operation is provided above by way of example with respect to FIG. 2. Those skilled in the art will readily recognize, in light of and in accordance with the teachings of the present invention, that this process may be similarly performed in structures comprising fewer or more channels and baffle walls or in structures comprising chambers and baffle walls of various different shapes.

As described in the foregoing, in some cases, the flow of the wastewater mixture through one or more of the channels may develop into a laminar flow as it passes through the first chamber. Typically, the flow of the wastewater mixture in the first channel begins as a turbulent flow when it enters the first chamber from the input. As the flow is directed to the end of the first channel that is opposite to the input, the flow may become more laminar. In some cases, laminar flow may develop in a boundary layer near the outer surface of the first influent and/or effluent baffle wall and the inner surface of the first chamber. Typically, the boundary layer grows in size as the flow approaches the end of the first channel opposite to the input. In some cases, the flow may become a laminar flow before exiting the first channel. The flow of the wastewater mixture entering the second chamber may be partially turbulent due to the transition between the first and second chambers. Similarly to the foregoing description for the first channel, the flow in the second channel may become more laminar as it flows through the second channel. Typically, the flow of the wastewater mixture in the second chamber becomes a laminar flow before the flow exits the second chamber.

In the present embodiment, in operation 306, a first treatment may be performed on the wastewater mixture in the first chamber to produce a partially processed mixture. This first treatment may involve a settling process whereby a portion of suspended solids in the wastewater mixture settles to the bottom of the first and second channels in the first chamber. In some cases, the settling process may also involve the floatation of light solids and/or flocculated material that was initially suspended in the wastewater mixture. Typically, the first treatment performed in operation 306 may also comprise an ammonification treatment performed in suboxic conditions. An ammonification process is described above by way of example with respect to first chamber 101 of FIG. 1A. As described in the foregoing, the suboxic treatment is typically only an initial processing step of a multi-step wastewater treatment system. However, in some applications, the ammonification process in a suboxic environment may be the only treatment performed on the wastewater mixture.

In the present embodiment, the influent and/or effluent baffle walls direct the flow of the wastewater mixture through the first chamber to provide a consistent treatment time for operation 306. In some embodiments, the wastewater is subjected to the first treatment for a detention time between 1440 and 8640 minutes. In other embodiments the, the wastewater may be subjected to the first treatment for a shorter or longer detention time. For example, without limitation, some embodiments may have detention times as short as 30 minutes, and some embodiments may have detention times as long as 30,000 minutes.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical system that those skilled in the art will readily know is suitable in light of the foregoing teachings.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a system and method of treating wastewater that includes concentric influent and/or effluent baffles according to the present invention will be apparent to those skilled in the art. Various aspects of the invention have been described above by way of illustration, and the specific embodiments disclosed are not intended to limit the invention to the particular forms disclosed. The particular implementation of the wastewater treatment system and method may vary depending upon the particular context or application. By way of example, and not limitation, the treatment systems described in the foregoing were principally directed to implementations relating to the treatment of wastewater; however, similar techniques may instead be applied to various different types of fluid treatment systems such as, but not limited to, drinking water systems, water softeners, sediment basins, or treatment systems for liquids other than water, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a first chamber being configured to receive a flow of a wastewater mixture from an input conduit, said first chamber comprising:
        a bottom;
        a top
        an outer wall;
        an inner wall;
        a first side wall;
        a second side wall;
        a first baffle wall, offset from said outer wall and connected to said first side wall, said input conduit located proximal to said first side wall, said first baffle wall and said outer wall forming a first channel within said first chamber, said first channel having a first channel input and a first channel output, and said first channel input being configured to receive the flow of the wastewater mixture from said input conduit and being operable for channeling the flow to said first channel output;
        a second baffle wall that is offset from said first baffle wall, said second baffle wall connected to said second side wall, and said second baffle wall being offset from said inner wall, thereby forming a second channel within said first chamber, said second channel having a second channel input and a second channel output, said second channel input being configured to substantially receive the flow from said first channel output and being operable for channeling the flow to said second channel output, said second baffle further forming a third channel, said third channel having a third channel input and a third channel output, and said third channel input being configured to substantially receive the flow from said second channel output and being operable for channeling the flow to said third channel output, said first, second and third channels thereby providing a lengthened, circuitous and fixed flow path for the wastewater mixture from the first channel input to the third channel output;

wherein each of said inner, outer, first and second baffle walls are semicircular;

wherein each of said walls are connected to the bottom of the first chamber; and wherein each of said walls extend to the top of the first chamber, said first chamber being operable for enabling the wastewater mixture to begin an initial stage of decomposition;

a second chamber, wherein said second chamber is configured to at least subject the wastewater mixture to a suboxic process;

a first dividing wall, wherein said first dividing wall is configured to separate said second chamber from said first chamber;

a first port disposed approximately half way up of said first dividing wall, said first port being operable to at least enable liquid to pass between said first chamber and said second chamber while blocking a sludge and a solid that have settled to the bottom and floated to the top of said first chamber;

a third chamber, wherein said third chamber is configured to subject the wastewater mixture to an aerobic digestion process;

a second dividing wall separating said second chamber from said third chamber;

a second port, wherein said second port is operable for enabling the flow of the wastewater mixture from said second chamber to said third chamber;

a fourth chamber, wherein said fourth chamber is configured to subject the wastewater mixture to an additional aerobic digestion process;

a fifth chamber, wherein said fifth chamber is configured to perform a clarification of the wastewater mixture; and a sixth chamber, wherein said sixth chamber is configured to serve as a water storage tank.

2. The system as recited in claim 1, in which said first baffle wall and said second baffle wall are configured to be removable for cleaning.

3. The system as recited in claim 1, further comprising at least a third dividing wall separating said fourth chamber from said third chamber.

4. The system as recited in claim 3, in which said third chamber is configured to enhance an oxygen content of the wastewater mixture and operable for promoting a growth of a colony of nitrifying microorganisms.

5. The system as recited in claim 1, in which said first chamber is configured to perform an ammonification wastewater treatment process on the wastewater mixture.

6. The system as recited in claim 1, in which said input conduit to said first chamber is joined to a sewer piping.

7. The system of claim 1, wherein the length of each of said first, second and third channels is from about five times to about twenty times the width of each of said channels.

* * * * *